(12) United States Patent
Wang et al.

(10) Patent No.: US 7,684,000 B2
(45) Date of Patent: Mar. 23, 2010

(54) PIXEL STRUCTURE AND LIQUID CRYSTAL DISPLAY PANEL USING THE SAME

(75) Inventors: Chih-Chieh Wang, Taipei County (TW); Yao-Hong Chien, Taoyuan County (TW); Xin-Xin Lin, Taoyuan County (TW); Li-Shan Chen, Taipei County (TW); Xuan-Yu Liu, Hualien County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 241 days.

(21) Appl. No.: 11/608,379

(22) Filed: Dec. 8, 2006

(65) Prior Publication Data

US 2008/0084529 A1 Apr. 10, 2008

(30) Foreign Application Priority Data

Oct. 5, 2006 (TW) .................................. 95137080

(51) Int. Cl.
*G02F 1/1343* (2006.01)
(52) U.S. Cl. ........................... 349/146; 349/38; 349/139
(58) Field of Classification Search ................... 349/38, 349/139, 146
See application file for complete search history.

(56) References Cited

U.S. PATENT DOCUMENTS

| | | | |
|---|---|---|---|
| 6,597,424 B2 | 7/2003 | Hattori et al. | |
| 6,600,540 B2 | 7/2003 | Yamakita et al. | |
| 6,603,525 B2 | 8/2003 | Yamakita et al. | |
| 6,661,491 B2 | 12/2003 | Yamakita et al. | |
| 7,291,860 B2 * | 11/2007 | Jung et al. | 257/59 |
| 7,414,682 B2 * | 8/2008 | Shiota et al. | 349/114 |
| 2002/0063835 A1 * | 5/2002 | Kim | 349/141 |

FOREIGN PATENT DOCUMENTS

JP 2002244159 8/2002

* cited by examiner

*Primary Examiner*—Uyen-Chau N Le
*Assistant Examiner*—John M Bedtelyon
(74) *Attorney, Agent, or Firm*—J.C. Patents

(57) ABSTRACT

A pixel structure including a substrate, a scan line, a data line, a common line, an active device, a pixel electrode, a passivation layer and a transition auxiliary electrode is provided. The scan line and the data line on the substrate intersect with each other to define a pixel region. The common line on the substrate is parallel to the scan line. The active device disposed within the pixel region is electrically connected to the scan line and the data line. The pixel electrode disposed within the pixel region is electrically connected to the active device. The passivation layer is between the data line and the pixel electrode. The transition auxiliary electrode is adjacent to the periphery of the pixel electrode and electrically connected to the common line through a contact hole of the passivation layer. The transition auxiliary electrode and the pixel electrode are made of the same film.

10 Claims, 6 Drawing Sheets

PIXEL STRUCTURE AND LIQUID CRYSTAL DISPLAY PANEL USING THE SAME

CROSS-REFERENCE TO RELATED APPLICATION

This application claims the priority benefit of Taiwan application serial no. 95137080, filed Oct. 5, 2006. All disclosure of the Taiwan application is incorporated herein by reference.

BACKGROUND OF THE INVENTION

1. Field of the Invention

The present invention relates to a pixel structure and a display panel. More particularly, the present invention relates to a pixel structure and a liquid crystal display panel suitable for an optically compensated birefringence liquid crystal display (OCB LCD).

2. Description of Related Art

The development of displays has become the focus of the industry due to the increasing demands. Cathode ray tube (CRT) display has been leading the market because of its excellent display quality and mature technique. However, in recent years, along with the rising consciousness of environmental conservation, CRT display has become unsatisfactory for it cannot meet the requirements of lightness, slimness, shortness, smallness, and low power consumption due to its high power consumption, high radiation, and its limitation in size reduction. Thus, thin film transistor liquid crystal display (TFT-LCD) having such characteristic as high image quality, high space efficiency, low power consumption, and no radiation is becoming the main stream in the market.

LCDs can be categorized into many different types according to the type of liquid crystal, the driving method, and the disposition of light source thereof. Wherein optically compensated birefringence liquid crystal display (OCB LCD) has very quick response time and can provide smooth imaging performance when it is used in a computer for playing quickly changing images such as animation or movie, thus, OCB LCD is very suitable for high-level LCD. However, an OCB LCD can only display normally with quick response time after liquid crystal molecules are transformed from splay state to bend state.

FIG. 1A is a diagram illustrating liquid crystal molecules in splay state in a liquid crystal display (LCD) panel. FIG. 1B is a diagram illustrating liquid crystal molecules in bend state in a liquid crystal display (LCD) panel. Referring to both FIG. 1A and FIG. 1B, in the OCB LCD panel 10, the liquid crystal layer 11 is disposed between the top substrate 12 and the bottom substrate 13. The top substrate 12 and the bottom substrate 13 respectively have an alignment layer (not shown) and the two alignment layers have the same rubbing direction. When no external electric field is supplied to the liquid crystal molecules in the liquid crystal layer 11, the liquid crystal molecules are arranged in splay state. When the OCB LCD is entering stand-by status, an electric field vertical to the top substrate 12 has to be supplied to the liquid crystal molecules so that the liquid crystal molecules are transformed into bend state. In a conventional OCB LCD, a few minutes time is required for the transition to drive all the pixels of an entire panel normally. In other words, a long transition time is required before the OCB LCD enters stand-by status, which is very disadvantageous to the instant-on characteristic of LCD. Thus, fast transition is prerequisite to OCB LCD to be acceptable to customers.

Conventionally, to quickly transform liquid crystal molecules in an OCB LCD from splay state to bend state, the voltage supplied is increased to produce stronger electric field so that the liquid crystal molecules can be transformed from splay state to bend state quickly. However, it is difficult to obtain suitable drive IC which can sustain high voltage, accordingly it is difficult to carry out related research and mass production, thus, a technique for producing transition threshold has to be used for reducing transition voltage and transition time and ensuring complete transition of the entire LCD panel. According to another conventional technique, polymer is added into the liquid crystal layer and irradiated with ultraviolet light when liquid crystal molecules are in bend state to form a polymer wall, so that the liquid crystal molecules can be maintained in bend state. Such a method may cause light leakage to an OCB LCD panel even though a simple process is adopted.

In the LCDs disclosed in U.S. Pat. No. 6,661,491, U.S. Pat. No. 6,600,540, and U.S. Pat. No. 6,603,525, the pixel electrode has slit and the transition of liquid crystal molecules is accelerated by the voltage differences between the pixel electrode and the top/bottom storage capacitance, the pixel electrode and the counter electrode, and the transverse electric field. In any of the LCDs disclosed in foregoing three patents, even though transition threshold can be produced by transverse electric field, slit in pixel electrode of the LCD may reduce the aperture ratio and the brightness of the LCD panel.

Besides, in the OCB LCD disclosed in U.S. Pat. No. 6,597,424, a plurality of protrusions or indentations are designed around the pixel electrode and voltage differences between the pixel electrode and the gate, the pixel electrode and the data line are used to produce transition threshold which can help transition of liquid crystal molecules, and further to shorten the time required for transforming liquid crystal molecules from splay state to bend state.

SUMMARY OF THE INVENTION

Accordingly, the present invention is directed to provide a pixel structure, wherein a transition auxiliary electrode is formed adjacent to a pixel electrode when forming the pixel electrode, and a voltage difference exists between the transition auxiliary electrode and the pixel electrode. The transverse electric field between the pixel electrode and the transition auxiliary electrode can accelerate the transition of liquid crystal molecules and resolve the conventional problem of storage capacitance reduction due to slit in pixel electrode.

According to another aspect of the present invention, a liquid crystal display (LCD) panel with quick response time is provided.

To achieve the aforementioned and other objectives, the present invention provides a pixel structure including a substrate, a scan line, a data line, a common line, an active device, a pixel electrode, a passivation layer, and a transition auxiliary electrode. The scan line and the data line are disposed on the substrate and intersect with each other to define a pixel region. The common line is disposed on the substrate and is substantially parallel to the scan line. The active device is disposed within the pixel region and is electrically connected to the scan line and the data line. The pixel electrode is disposed within the pixel region and is electrically connected to the active device. The passivation layer is disposed between the pixel electrode and the data line. The transition auxiliary electrode is disposed adjacent to the periphery of the pixel electrode and is electrically connected to the common line through a contact hole of the passivation layer. The pixel electrode and the transition auxiliary electrode are made of the same film.

According to an embodiment of the present invention, the active device is a thin film transistor.

According to an embodiment of the present invention, the common line is adjacent to a scan line next to the foregoing scan line.

According to an embodiment of the present invention, the transition auxiliary electrode is located between the common line and the next scan line.

According to an embodiment of the present invention, the transition auxiliary electrode is located above the next scan line.

According to an embodiment of the present invention, the transition auxiliary electrode is adjacent to the data line.

According to an embodiment of the present invention, the transition auxiliary electrode is located above the data line.

According to an embodiment of the present invention, the shape of the side of the pixel electrode adjacent to the transition auxiliary electrode corresponds to the shape of the transition auxiliary electrode.

According to an embodiment of the present invention, the shape of the transition auxiliary electrode includes zigzag shape.

Moreover, the pixel structure in the present invention may also be applied to an active device array substrate in a LCD panel, and the structure of the pixel structure is as described above therefore will not be described herein.

According to the pixel structure in the present invention, a transverse electric field is produced between the transition auxiliary electrode and the pixel electrode. The transverse electric field changes the arrangement of some liquid crystal molecules. When a transition voltage is supplied to a LCD panel, each pixel produces a transition threshold so that liquid crystal molecules can be transformed to bend state quickly, accordingly the transition time of the LCD panel can be shortened.

Moreover, the transition auxiliary electrode may be disposed above the scan line or the data line, thus, only storage capacitance at the contact hole may be lost, accordingly, the LCD panel in the present invention has high aperture ratio.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
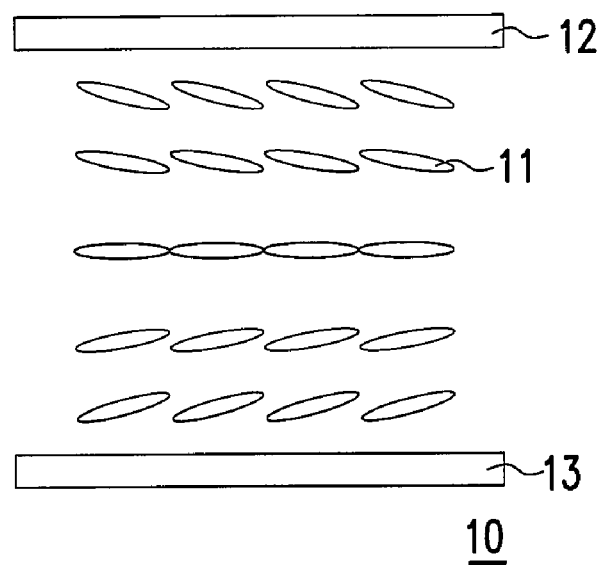
FIG. 1A is a diagram illustrating liquid crystal molecules in splay state in a liquid crystal display (LCD) panel.
Figure 1B:
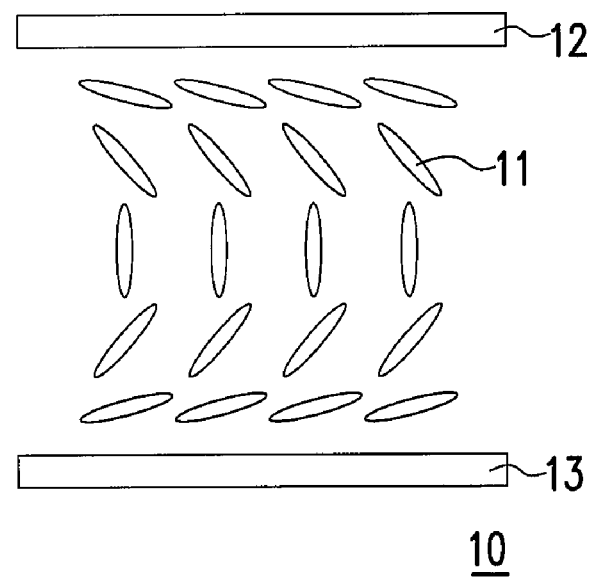
FIG. 1B is a diagram illustrating liquid crystal molecules in bend state in a liquid crystal display (LCD) panel.
Figure 2A:
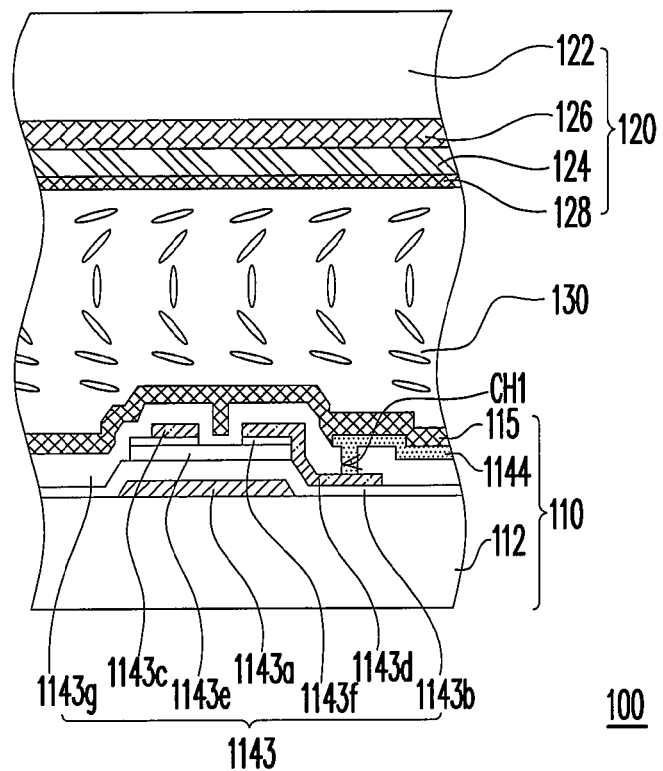
FIGS. 2A and 2B are partial cross-sectional views of a LCD panel according to an embodiment of the present invention.
Figure 2B:
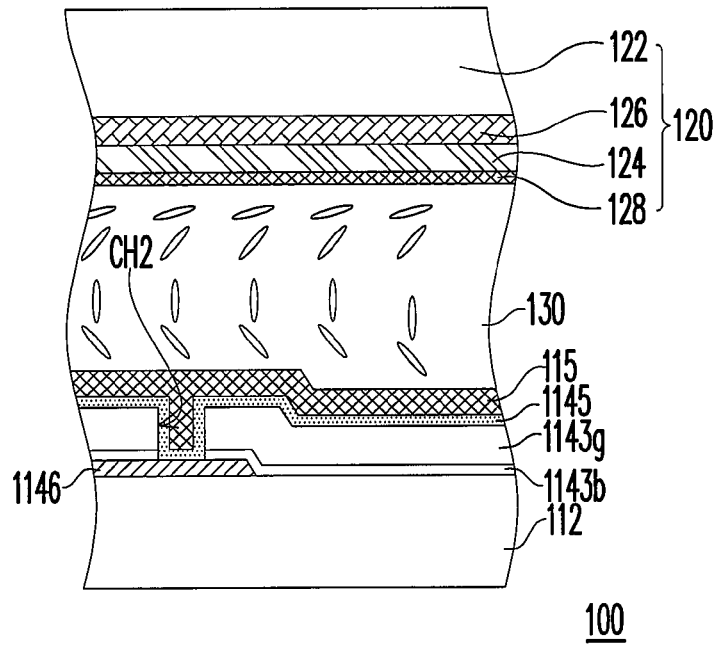
Figure 2C:
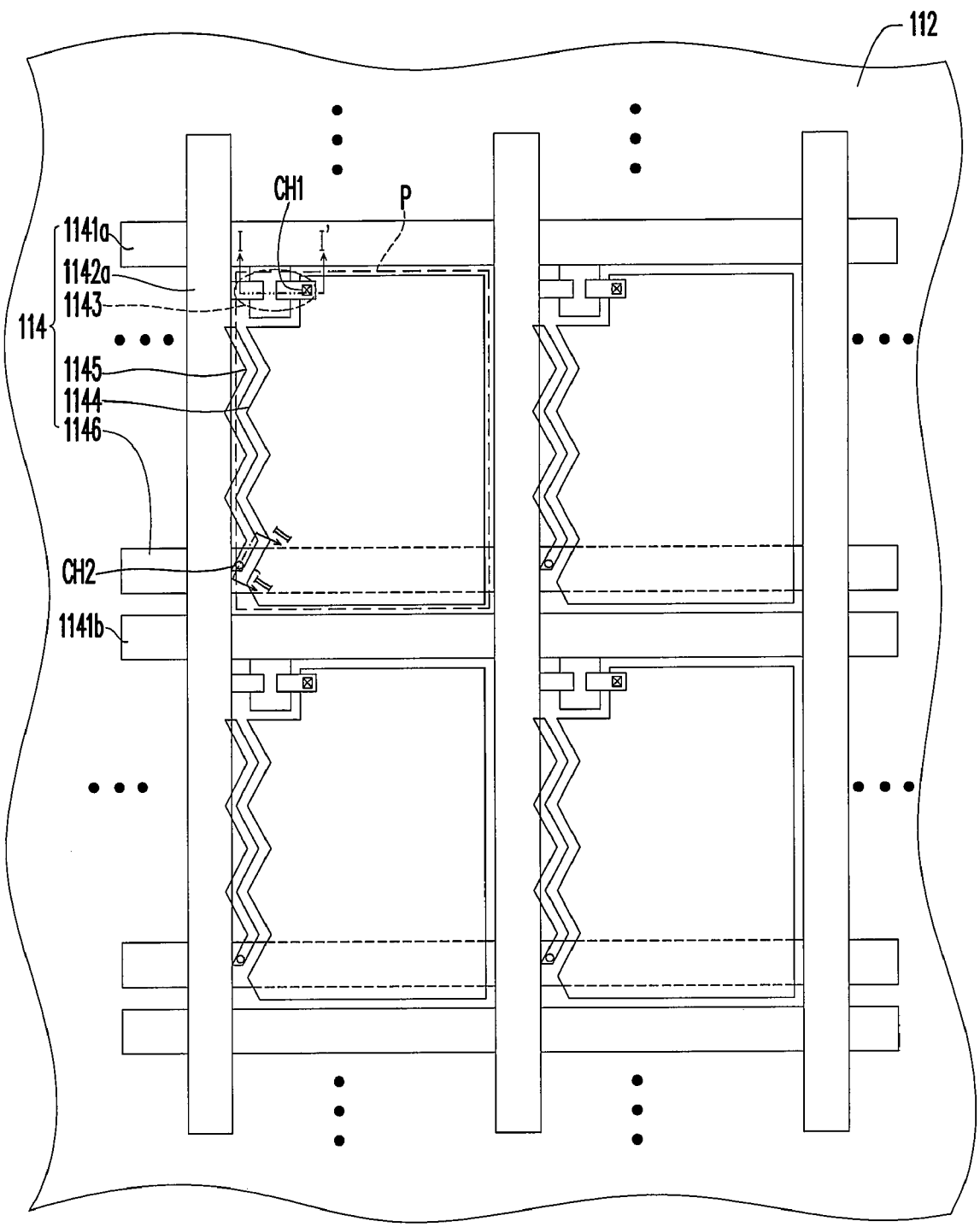
FIG. 2C is a vertical view of an active device array substrate in the LCD panel in FIGS. 2A and 2B.

FIGS. 2A and 2B are partial cross-sectional views of a liquid crystal display (LCD) panel according to an embodiment of the present invention. FIG. 2C is a vertical view of an active device array substrate in the LCD panel in FIGS. 2A and 2B. Wherein FIG. 2A is a cross-sectional view of the active device array substrate in FIG. 2C cut along line I-I', and FIG. 2B is a cross-sectional view of the active device array substrate in FIG. 2C cut along line II-II'. Referring to FIGS. 2A, 2B, and 2C, the LCD panel 100 is an optically compensated birefringence (OCB) LCD panel. LCD panel 100 includes an active device array substrate 110, a color filter substrate 120, and a liquid crystal layer 130. The color filter substrate 120 is disposed above the active device array substrate 110, and the liquid crystal layer 130 is disposed between the color filter substrate 120 and the active device array substrate 110.

The active device array substrate 110 includes a first substrate 112 and a plurality of pixel structures 114 disposed on the first substrate 112. Each of the pixel structures 114 includes a scan line 1141a, a data line 1142a, an active device 1143, a pixel electrode 1144, and a transition auxiliary electrode 1145. The first substrate 112 may be a glass substrate, a silicon substrate, or a substrate of other suitable materials. The scan lines 1141a and the data lines 1142a are disposed on the first substrate 112 for defining a pixel region P on the first substrate 112. In addition, the scan lines 1141a and the data lines 1142a may be lead wires of aluminum alloy or other suitable conductive materials. The active devices 1143 are disposed on the first substrate 112. Each of the active devices 1143 is electrically connected to the corresponding scan line 1141a and data line 1142a. The pixel electrodes 1144 are electrically connected to the active devices 1143 through a contact hole CH1.

In the present embodiment, each of the active devices 1143 is a thin film transistor including a gate 1143a, a gate insulation layer 1143b, a source 1143c, a drain 1143d, a channel layer 1143e, an Ohmic contact layer 1143f, and a passivation layer 1143g. The gate 1143a is electrically connected to the scan line 1141a, the source 1143c is electrically connected to the data line 1142a, and the pixel electrode 1144 is electrically connected to the drain 1143d through the contact hole CH1 in the passivation layer 1143g. The material of the pixel electrode 1144 may be ITO, IZO, or other transparent conductive materials.

The transition auxiliary electrode 1145 and the pixel electrode 1144 are made of the same film, thus, the material of the transition auxiliary electrode 1145 may also be ITO, IZO, or other transparent conductive materials. However, the transition auxiliary electrode 1145 and the pixel electrode 1144 are electrically insulated from each other, and a transverse electric field is produced between the two. Besides, the transition auxiliary electrode 1145 is disposed adjacent to the periphery of the pixel electrode 1144. Referring to FIG. 2C, in the present embodiment, the transition auxiliary electrode 1145 is located at the left side of the pixel electrode 1144 and adjacent to the data line 1142a. The transition auxiliary electrode 1145 may be of any shape such as zigzag shape, and the shape of the side of the pixel electrode 1144 corresponds to the shape of the transition auxiliary electrode 1145, which may also be zigzag shape.

Referring to both FIG. 2B and FIG. 2C, the pixel structure 114 further includes a common line 1146 disposed on the first substrate 112 and substantially parallel to the scan line 1141a. In the present embodiment, the common line 1146 is adjacent to the next scan line 1141b and the transition auxiliary electrode 1145 is electrically connected to the common line 1146 through the contact hole CH2 in the passivation layer 1143g.

Referring to FIG. 2A, the color filter substrate 120 includes a second substrate 122, an electrode layer 124, and a color filter film 126. The second substrate 122 may be a glass substrate, a silicon substrate, or a substrate of other suitable materials. The electrode layer 124 is disposed above the second substrate 122 and the material of the electrode layer 124 may be ITO, IZO, or other suitable conductive materials. The color filter film 126 is disposed between the second substrate 122 and the electrode layer 124, and the color filter film 126 contains a black matrix (not shown) and a plurality of color filter patterns (not shown).

Moreover, the active device array substrate 110 further includes an alignment layer 115 covering the pixel structures 114, and the material of the alignment layer 115 may be polyimide resin (PI) or other suitable materials. An alignment layer 128 may also be disposed on the electrode layer 124 of the color filter substrate 120, and the alignment layer 128 has a rubbing direction identical or parallel to that of the alignment layer 115.

The production of a transverse electric filed in the LCD panel 100 will be described below. Generally before the LCD panel 100 displaying an image, the transition auxiliary electrodes 1145 of the pixel structures 114 and the corresponding common lines 1146 are electrically connected to a voltage V, and the corresponding pixel electrodes 1144 are electrically connected to a driving voltage $V_d$. Voltage V may be a constant value, while the driving voltage $V_d$ changes along with the images to be displayed. It should be noted here that the voltage V may be different to the driving voltage $V_d$. Accordingly, a transverse electric field is produced between the transition auxiliary electrode 1145 and the pixel electrode 1144. In the liquid crystal layer 130, those liquid crystal molecules originally in splay state are twisted first under the transverse electric field. When the LCD panel 100 is driven for transition, a vertical electric field is supplied to the liquid crystal layer 130 and those liquid crystal molecules twisted by the transverse electric field may be used as transition threshold for driving other liquid crystal molecules to be quickly transformed into bend state. Accordingly, in the present invention, liquid crystal molecules can be quickly transformed into bend state; in other words, the LCD panel 100 can operate normally and present quick response performance after it is quickly transformed.

The transition auxiliary electrode 1145 and the pixel electrode 1144 are made of the same film, and the transition auxiliary electrode 1145 is formed adjacent to the periphery of the pixel electrode 1144. Besides, the transition auxiliary electrode 1145 is electrically connected to the common line 1146 through the contact hole CH2 in the passivation layer 1143g, and a transverse electric field is produced by the voltage difference between the transition auxiliary electrode 1145 and the pixel electrode 1144 to assist the transition of liquid crystal molecules.

Figure 3A:
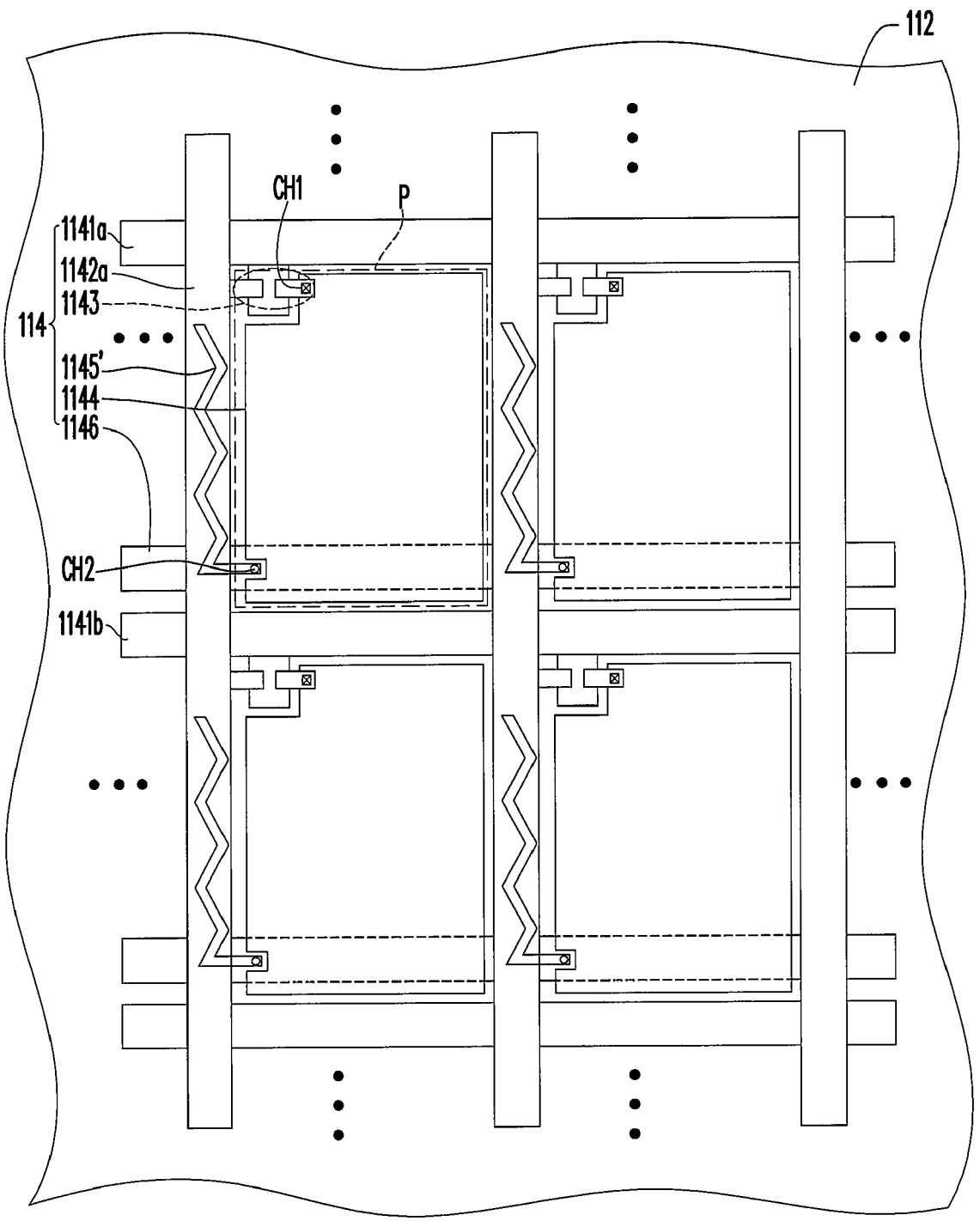
FIGS. 3A~3C are vertical views of active device array substrates in LCD panels according to other embodiments of the present invention.
Figure 3B:
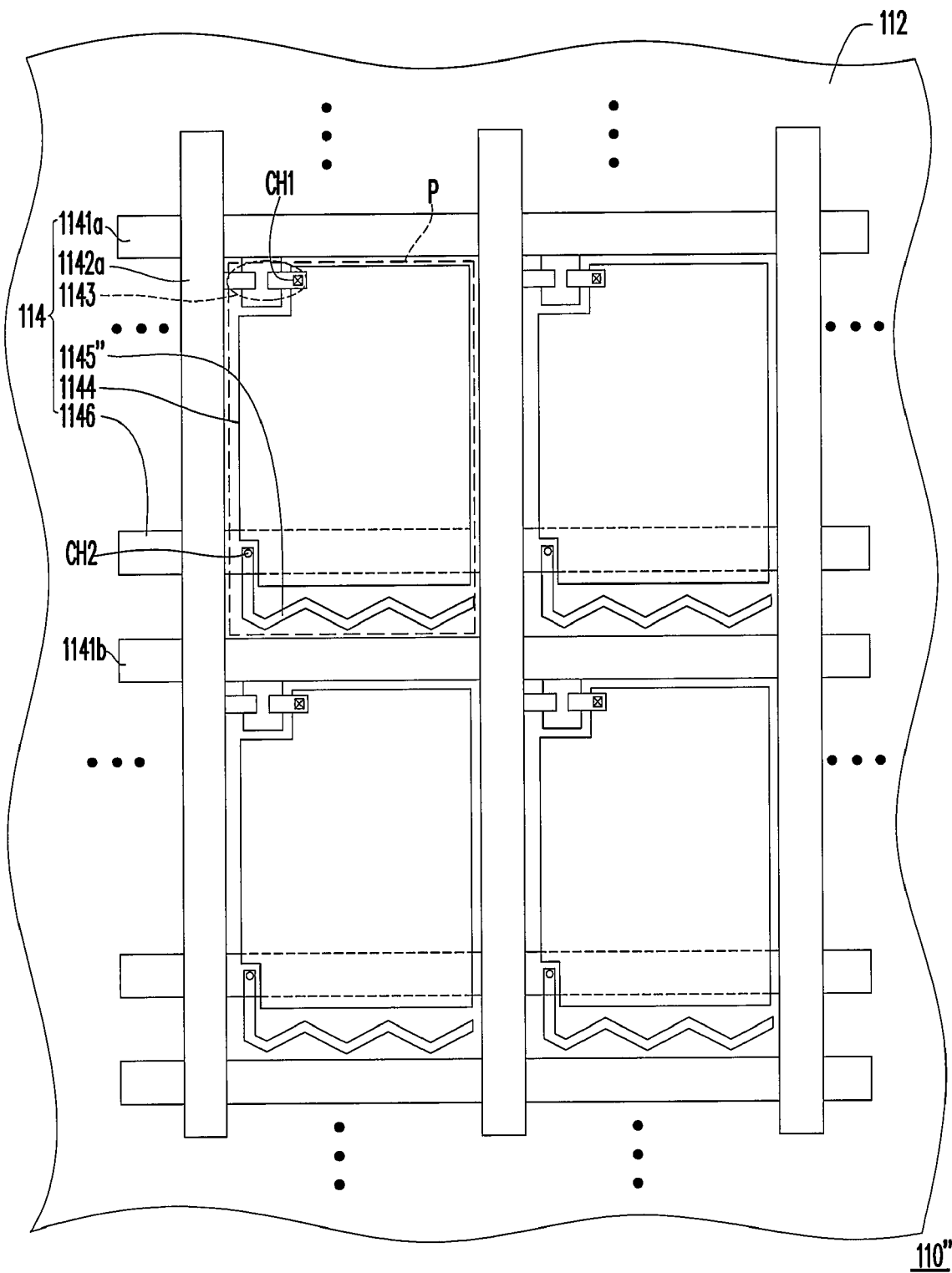
Figure 3C:
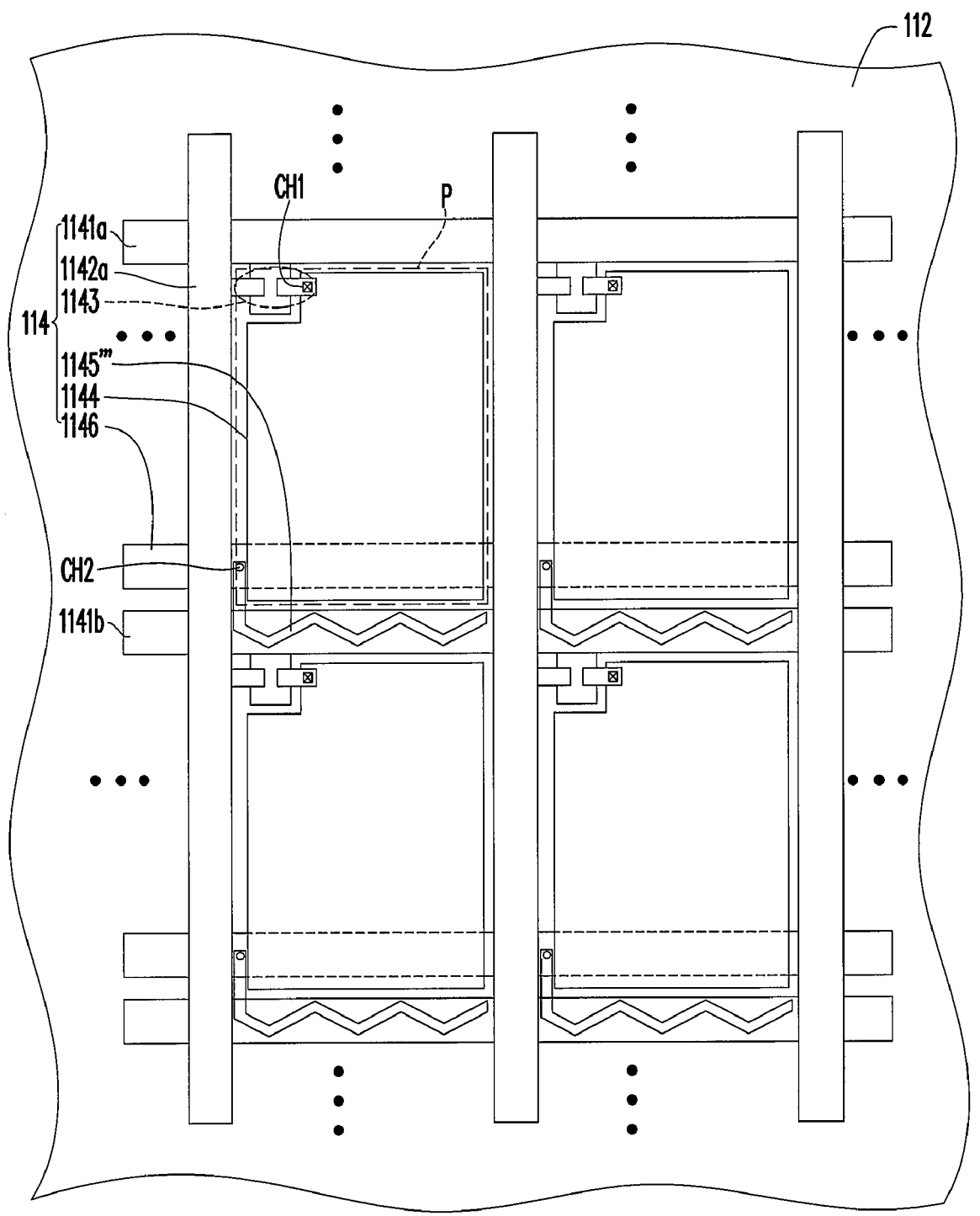

FIGS. 3A~3C are vertical views of active device array substrates in LCD panels according to other embodiments of the present invention. The structures of the active device array substrates 110', 110'', and 110''' are similar to the structure of the active device array substrate 110 in FIG. 2C, and the differences thereof are described herein. First, referring to FIG. 3A, the transition auxiliary electrode 1145' in the active device array substrate 110' is located above the data line 1142a, thus, the only capacitance at the contact hole is lost, so that the aperture ratio of the LCD panel can be increased. Referring to FIG. 3B, in the present embodiment, the transition auxiliary electrode 1145'' in the active device array substrate 110'' is located between the common line 1146 and the next scan line 1141b. Finally, referring to FIG. 3C, in the present embodiment, the transition auxiliary electrode 1145''' is located above the next scan line 1141b so that the aperture ratio of the LCD panel can be increased.

In summary, the pixel structure and the LCD panel in the present invention have at least following advantages:

1. According to the pixel structure in the present invention, a transverse electric field is produced between the transition auxiliary electrode and the pixel electrode. In addition, voltage differences between the transition auxiliary electrode and the scan line, the transition auxiliary electrode and the data line also exist besides the supply voltage between the two substrates when liquid crystal molecules are transformed, thus, transverse electric field also exists around the transition auxiliary electrode. The transverse electric field changes the arrangement of some liquid crystal molecules. When the LCD panel is driven for transition, the other liquid crystal molecules can be quickly transformed into bend state, so that the transition time and transition voltage required by the LCD panel can be reduced.

2. The manufacturing processes of the pixel structure and the LCD panel in the present invention are compatible with existing processes. Only a few masks are redesigned and no additional equipment is required, thus, the manufacturing processes of the pixel structure and the LCD panel in the present invention can be applied to existing process of active device array substrate.

3. The transition auxiliary electrode may be formed above the scan line or the data line, thus, only storage capacitance corresponding to the contact hole is lost, so that the LCD panel has high aperture ratio.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
a substrate;
a scan line, disposed on the substrate;
a data line, disposed on the substrate, wherein the scan line and the data line intersect with each other to define a pixel region;
a common line, disposed on the substrate, the common line being substantially parallel to the scan line;
an active device, disposed within the pixel region, the active device being electrically connected to the scan line and the data line;
a pixel electrode, disposed within the pixel region, the pixel electrode being electrically connected to the active device, wherein the pixel electrode substantially has an entirely block shape;
a passivation layer, disposed between the pixel electrode and the data line, the pixel electrode being electrically connected to other layers through one single contact hole of the passivation layer; and
a transition auxiliary electrode, adjacent to one side of the pixel electrode and disposed on periphery of the pixel region, the pixel electrode and the transition auxiliary electrode being in a common layer, wherein the transition auxiliary electrode is electrically connected to the common line through a contact hole of the passivation layer, and the transition auxiliary electrode is totally overlapped with the data line and the common line in a vertical view direction.

2. A liquid crystal display (LCD) panel, comprising:

an active device away substrate, comprising a plurality of pixel structures, wherein the pixel structures are disposed on the active device array substrate as an array, and each of the pixel structures comprises:
   a substrate;
   a scan line disposed on the substrate;
   a data line disposed on the substrate, wherein the scan line and the data line intersect with each other to define a pixel region;
   a common line disposed on the substrate, the common line being substantially parallel to the scan line;
   an active device disposed within the pixel region, the active device being electrically connected to the scan line and the data line;
   a pixel electrode disposed within the pixel region, the pixel electrode being electrically connected to the active device;
   a passivation layer disposed between the pixel electrode and the data line; and
   a transition auxiliary electrode, adjacent to one side of the pixel electrode and disposed on periphery of the pixel region, the pixel electrode and the transition auxiliary electrode being in a common layer, wherein the transition auxiliary electrode is electrically connected to the common line through a contact hole of the passivation layer;

a color filter substrate, disposed at one side of the active device array substrate; and a liquid crystal layer, disposed between the active device array substrate and the color filter substrate, wherein the liquid crystal layer is an optically compensated birefringence liquid crystal layer.

3. The LCD panel as claimed in claim 2, wherein the active device is a thin film transistor.

4. The LCD panel as claimed in claim 2, wherein the common line is adjacent to a next scan line.

5. The LCD panel as claimed in claim 4, wherein the transition auxiliary electrode is located between the common line and the next scan line.

6. The LCD panel as claimed in claim 4, wherein the transition auxiliary electrode is overlapped with the next scan line.

7. The LCD panel as claimed in claim 2, wherein the transition auxiliary electrode is adjacent to the data line.

8. The LCD panel as claimed in claim 2, wherein the transition auxiliary electrode is totally overlapped with the data line and the common line.

9. The LCD panel as claimed in claim 2, wherein the shape of a side of the pixel electrode adjacent to the transition auxiliary electrode corresponds to that of the transition auxiliary electrode.

10. The LCD panel as claimed in claim 2, wherein the shape of the transition auxiliary electrode comprises zigzag shape.

* * * * *